United States Patent Office 3,408,351
Patented Oct. 29, 1968

3,408,351
METHOD OF PREPARING OCTAHYDRO-
PHENANTHRIDINES
Harry Chafetz, Poughkeepsie, and Edwin L. Patmore,
Fishkill, N.Y., assignors to Texaco Inc., New York,
N.Y., a corporation of Delaware
No Drawing. Filed Aug. 25, 1966, Ser. No. 574,901
9 Claims. (Cl. 260—283)

ABSTRACT OF THE DISCLOSURE

A method of preparing 1,2,3,4,7,8,9,10-octahydro-phenanthridines which are useful as corrosion inhibitors in oil and gas well fluids comprising contacting a 2-(1-cyclohexenyl)cyclohexanone with a hydrocarbyl amide in the presence of an acidic catalyst.

---

This invention relates to a method of preparing 1,2,3,4,7,8,9,10-octahydrophenanthridines of the formula:

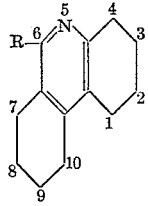

where R is a substituent selected from the group consisting of hydrogen, alkyl, aryl, alkaryl and aralkyl of one to 20 carbons.

The octahydrophenanthridine products of the invention are useful in amounts of between about 0.5 and 5 wt. percent as corrosion inhibitors in oil and gas wells, and pickling acids. In the past, one method of producing octahydrophenanthridines called for the reaction of 2-(1-cyclohexenyl)cyclohexanone, an aldehyde and ammonia in the presence of catalyst. Although this method is quite effective in producing the desired octahydrophenan-thridines, it has the disadvantage of utilizing relatively expensive aldehydes and further requires the employment of ammonia which due to its ready volatility requires special handling which further undesirably adds to the process expense.

We have discovered a method of preparing the octahydrophenanthridines as defined wherein the employment of ammonia is eliminated and the relatively less expensive amide reactant is substituted for the aldehyde reactant.

More particularly, the method of the invention comprises contacting 2-(1-cyclohexenyl)cyclohexanone with a hydrocarbyl amide of the formula:

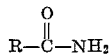

where R is as heretofore defined in the presence of an acidic catalyst. Examples of acidic catalysts contemplated herein are the acidic metal oxides such as thoria, alumina, silica, silica-alumina, silica-thoria, alumina-thoria, and silica, alumina or thoria combined with minor amounts of e.g., between 5 to 40 wt. percent of chromia, magnesia, or boria and mixtures thereof. Additional suitable catalysts are the mineral acids such as sulfuric acid and polyphosphoric acid; strong organic acids such as toluene sulfonic acids and sulfonated divinyl-benzene crosslinked polystyrene resins; additional suitable acid materials are phosphorus oxychloride and phosphorus pentoxide.

Under advantageous conditions, the reaction is conducted at a temperature between about 80 and 375° C. in a mole ratio of amide to cyclohexenyl cyclohexanone of between about 1:5 and 5:1. However, when the catalyst is an acidic metal oxide as defined the reaction should be conducted above about 220° C. Further when the catalyst is one of the sulfonated divinylbenzene cross-linked polystyrene resins such as the tradename product Amberlyst 15 the reaction temperature is preferably maintained below about 150° C. Amberlyst 15 is manufactured and sold by the Rohm & Haas Company.

The method is broadly described by the following equation:

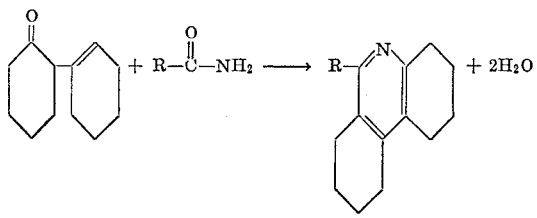

where R is as heretofore defined. Referring to the above equation, it is to be noted that in cases where the amide R is other than pentyl there is produced in many instances along with the corresponding octahydrophenanthridine, 6-pentyl-1,2,3,4,7,8,9,10-octahydrophenanthridine.

The method may be conducted under continuous or batch conditions. Under continuous process conditions the reaction is preferably conducted in the vapor phase with a mixture of the amide and cyclohexenyl cyclohexanone reactant passed over or through a bed of catalyst particles preferably of a size between about 1/16″ and 1/2″ utilizing a preferred average contact time of between about 1 and 10 seconds. The vapor phase reaction is normally conducted at a temperature above about 300° C. at atmospheric pressure, however, subatmospheric and superatmospheric pressures up to about 50 p.s.i.g. may also be employed. The quantity of catalyst employed in the vapor phase reaction in terms of liquid space velocity at 20° C. is advantageously between about 0.1 and 3 volumes reactant/volume catalyst/hour.

Under batch reaction conditions, the reaction is normally conducted in the liquid phase preferably with the continual removal of water. In order to facilitate water removal, an inert organic liquid (e.g., liquid hydrocarbon) of a boiling point between about 60 and 225° C. which forms an azeotrope with water is desirably employed. Desirably, during the vapor phase reaction inert gas such as nitrogen is passed through the reaction zone to function as a carrier gas for the reactants and product. The quantity of inert gas employed in terms of space velocity calculated at 21° C. is advantageously between about 35 and 245 volumes inert gas/volume reactor occupied by catalyst/hour. Most preferably, the inert gas introduction is instituted prior to reactant introduction in order to flush out any air and thereby decrease the change of any undesired oxidation during the reaction. The liquid organic azeotroping agent advantageously constitutes between about 50 and 90 wt. percent of the initial reaction mixture. Further, in the batch reaction, the catalytic materials employed normally constitute about 0.7 to 35 wt. percent of the reaction mixture. Still further, atmospheric pressures are normally employed but subatmospheric and superatmospheric pressures up to 50 p.s.i.g. may be utilized if desired to facilitate the removal of water or to maintain the reactants in the liquid phase, that is, prevent their escape from the reaction zone.

The octahydrophenanthridine product is recovered from the final reaction mixture by standard means such as fractional distillation, filtration, extraction, chromatographic separation and combinations thereof.

Specific examples of the amide reactants contemplated herein are acetamide, hexanamide, benzamide, formamide, capramide, lauramide, 4-ethylbenzamide, 2-ethylbenzamide and α-phenylacetamide.

Specific examples of the inert liquid organic azeotroping agents for water contemplated herein are toluene, xylene, tetralin, decalin, benzene, mesitylene, n-nonane, n-octane, n-decane, cyclohexane, and chlorinated solvents such as chlorobenzene, dichlorobenzene, chloroform and carbon tetrachloride.

Specific examples of the octahydrophenanthridine products contemplated herein are 1,2,3,4,7,8,9,10-octahydrophenanthridine, 6-phenyl - 1,2,3,4,7,8,9,10 - octaphenanthridine, 6 - undecyl - 1,2,3,4,7,8,9,10 - octahydrophenanthridine, 6 - heptyl - 1,2,3,4,7,8,9,10 - octahydrophenanthridine, 6-(4-methylphenyl)-1,2,3,4,7,8,9,10 - octahydrophenanthridine, 6-(2 - ethylphenyl)-1,2,3,4,7,8,9,10-octahydrophenanthridine, 6-naphthyl-1,2,3,4,7,8,9,10-octahydrophenanthridine, and 6-phenylmethyl-1,2,3,4,7,8,9,10-octahydrophenanthridine.

The following examples further illustrate the invention but are not to be construed as limitations thereof.

EXAMPLE I

This example illustrates the continuous, vapor phase embodiment of the method of the invention.

The following runs were carried out in a 1″ x 24″ Pyrex tube positioned vertically in an electric tube furnace having a heating area of 18″ in length. The temperature was sensed by a thermocouple located external to the tube and extending from approximately the center of the heating chamber to the top. The tube was packed with a 6″ layer of Berl saddles on the bottom, a 6″ layer of pelleted catalyst of an average diameter of about 5/32″ in the middle and a 6″ layer of Berl saddles on top. The tube was fitted at its upper end with an adapter connected to a pressure equalizing funnel and a system for introducing a metered flow of nitrogen gas. The bottom end of the tube was connected to a receiver attached to a water cooled condenser followed by a trap cooled in a Dry Ice-isopropanol mixture. The catalyst pellets employed were a silica-magnesia combination containing 70–75 wt. percent silica and 25–30 wt. percent magnesia.

The prepared reaction tube was preheated at 450° C. for about one-half hour while being swept with a stream of dry nitrogen and was allowed to cool to the desired operating temperature. The 2-(1-cyclohexenyl) cyclohexanone and amide were charged to the tube from a dropping funnel during which time nitrogen was continuously passed through the reactor in order to facilitate the passage of a reactant therethrough and the recovery of the products therefrom. The products were recovered in the cold traps and analyzed by gas chromatography.

Specific test data and results of the runs using the above method are reported below in Tables Ia and Ib. In Runs A, B, C and E the catalyst consisted of 70% silica and 30% magnesia. In Run D it consisted of 75% silica and 25% magnesia. The nitrogen rate in all runs save Run D was 235 mls./minute. Also in Run D the rate was 34 mls./minute. Tables Ia and Ib are set forth immediately below. The reaction time was calculated on the basis of volume of reactants at 310° C. and the volume of the reaction tube occupied by catalyst (58 cc.).

TABLE Ia

| Description | Runs | | |
|---|---|---|---|
| | A | B | C |
| Reactants: | | | |
| Amide | Acetamide | Benzamide | Formamide |
| Amide, g | 29.4 | 24.2 | 18 |
| 2-(1-cyclohexenyl)-cyclohexanone, g | 35 | 35.7 | 53.4 |
| Mole ratio, amide/ketone | 2.5 | 1 | 1.35 |
| React. Cond.: | | | |
| Temp., °C | 350 | 310 | 310 |
| N₂ rate, mls./min., 21° C | 235 | 235 | 235 |
| React. residence, secs | 5.5 | 6.6 | 5.2 |
| Conversion ketone react., percent | 96 | 33 | 79 |
| 6-group—1,2,3,4,7,8,9,10-octahydrophenanthridine product: | | | |
| 6-group (yield, mole percent)* | Methyl (13), pentyl (6) | Phenyl (20), pentyl (9.5) | Hydrogen (11) |

*Based on unrecovered cyclohexanone reactant.

TABLE Ib

| Description | Runs | |
|---|---|---|
| | D | E′ |
| Reactants: | | |
| Amide | Lauramide | Hexamide |
| Amide, g | 39.8 | 23.0 |
| 2-(1-cyclohexenyl)-cyclohexanone, g | 35.6 | 35 |
| Mole ratio, amide/ketone | 1 | 1 |
| React. cond.: | | |
| Temp., °C | 310 | 310 |
| N₂ rate, mls./min., 21° C | 34 | 235 |
| React. residence, secs | 4.9 | 6.5 |
| Conversion ketone react., percent | 52 | 56 |
| 6-group—1,2,3,4,7,8,9,10-octahydrophenanthridine product: | | |
| 6-group (yield, mole percent)* | Undecyl (20), pentyl (17) | Pentyl (24) |

* Based on unrecovered cyclohexanone reactant.

EXAMPLE II

This example illustrates the liquid phase, batch, embodiment of the method of the invention.

To a 3-neck flask equipped with a mechanical stirrer, thermometer, and water separator fitted with a condenser which in turn is connected to a trap cooled by a Dry Ice-isopropanol mixture, there was charged amide reactant, 2-(1-cyclohexenyl) cyclohexanone, catalyst and a liquid hydrocarbon water azeotroping agent (when used). The reaction mixture was heated for the required time at the desired temperature with the continuous removal of water as overhead after which the hot solution was decanted from the catalyst. The catalyst was washed several times with fresh solvent ethanol and the washings were added to the filtrate. The resultant mixture was then cooled and any amide that precipitated was filtered and dried. The filtrate was then distilled. Alternatively in some cases the reaction mixture was distilled without removing the amide. The final products were analyzed by gas chromatography.

The foregoing procedure was repeated utilizing various amide reactants, catalysts and liquid hydrocarbon azeotroping agents as well as various reactant amounts and conditions. The test data and results are reported below in Tables IIa to IId.

TABLE IIa

| Description | Runs | | |
|---|---|---|---|
| | E″ | F | G |
| Reactants and solvent: | | | |
| Amide | Lauramide | Lauramide | Lauramide |
| Amide, grams | 19.9 | 19.9 | 19.9 |
| 2-(1-cyclohexenyl)-cyclohexanone, g | 17.8 | 17.8 | 17.8 |
| Catalyst | Amberlyst 15 | H₂SO₄ | Polyphosphoric acid |
| Catalyst, g | 5 | 10 | 5 |
| Solvent | Toluene | Toluene | |
| Solvent, mls | 200 | 300 | |
| Reaction conditions: | | | |
| Temperature, °C | 146–148 | 110–115 | 186–210 |
| Reaction time, hrs | 12 | 8 | 7.8 |
| Conversion of ketone react., percent | 75 | 99 | 80 |
| 6-group—1,2,3,4,7,8,9,10-octahydrophenanthridine product: | | | |
| 6-group (yield, mole percent)* | Undecyl (60) | Undecyl (30), pentyl (5) | Undecyl (35), pentyl (27) |

*Based on converted cyclohexanone reactant.

TABLE IIb

| Description | Runs | | |
|---|---|---|---|
| | H | I | J |
| Reactants and solvent: | | | |
| Amide | Benzamide | Formamide | Lauramide. |
| Amide, g | 60.5 | 22.5 | 39.8. |
| 2-(1-cyclohexenyl) cyclohexanone, g | 89 | 89 | 35.6. |
| Catalyst | Amberlyst 15 | Amberlyst 15 | 75% SiO₂, 25% MgO. |
| Catalyst, g | 15 | 15 | 34.7. |
| Solvent | Xylene | Xylene | |
| Solvent, mls | 300 | 200 | |
| Reaction conditions: | | | |
| Temperature, °C | 143-157 | 145-150 | 200-280. |
| Reaction time, hrs | 20.1 | 24.3 | 9. |
| Conversion of ketone react., percent | 60 | 34 | 97. |
| 6-group—1,2,3,4,7,8,9,10-octahydrophen-anthridine product: | | | |
| 6-group (yield, mole percent)* | Phenyl (70) | Hydrogen (25). | Undecyl (12.9), pentyl (35). |

*Based on converted cyclohexanone reactant.

TABLE IIc

| Description | Runs | | |
|---|---|---|---|
| | K | L | M |
| Reactants and solvent: | | | |
| Amide | Acetamide | Acetamide | Acetamide. |
| Amide, g | 17.7 | 17.7 | 17.7. |
| 2-(1-cyclohexenyl) cyclohexanone | 53.4 | 53.4 | 53.4. |
| Catalyst | POCl₃ | P₂O₅ | p-Toluene sulfonic acid. |
| Catalyst, g | 35 | 35 | 2. |
| Solvent | Tetralin | Tetralin | Tetralin. |
| Solvent, mls | 200 | 200 | 200. |
| Reaction conditions: | | | |
| Temperature, °C | 147-179 | 146-166 | 169-177. |
| Reaction time, hrs | 6.7 | 10.3 | 15.9. |
| Conversion of ketone react., percent | 66 | 75 | 66. |
| 6-group—1,2,3,4,7,8,9,10-octahydrophen-anthridine product: | | | |
| 6-group (yield, mole percent)* | Methyl (20) | Methyl (18) | Methyl (8). |

*Based on converted cyclohexanone reactant.

TABLE IId

| Description | Runs | |
|---|---|---|
| | N | O |
| Reactants and Solvent: | | |
| Amide | Lauramide | Lauramide. |
| Amide, g | 39.8 | 19.9. |
| 2-(1-cyclohexenyl) cyclohexanone, g | 35.6 | 17.8. |
| Catalyst | p-Toluene sulfonic acid. | Amberlyst 15. |
| Catalyst, g | 0.5 | 5. |
| Solvent | | |
| Solvent, mls | | |
| Reaction Conditions: | | |
| Temperature, °C | 230-264 | 230-275. |
| Reaction time, hrs | 10.6 | 7.6. |
| Conversion of Ketone React., percent | 84 | 96. |
| 6-group—1,2,3,4,7,8,9,10-octahydrophenanthridine product: | | |
| 6-group (yield, mole percent)* | Undecyl (20), pentyl (21). | Undecyl (17), pentyl (21). |

*Based on converted cyclohexanone reactant.

We claim:

1. A method of producing an octahydrophenanthridine of the formula:

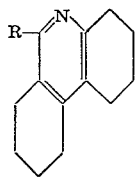

where R is selected from the group consisting of hydrogen and alkyl, aryl, alkaryl and aralkyl from 1 to 20 carbons comprising contacting a mixture of 2-(1-cyclohexenyl)-cyclohexanone and an amide of the formula:

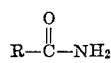

where R is as heretofore defined at a temperature of between about 80 and 375° C. in the presence of a catalyst selected from the group consisting of alumina, silica, thoria, silica-alumina, silica-thoria, thoria-alumina, silica-5 to 40 wt. percent chromia, silica-5 to 40 wt. percent magnesia, silica-5 to 40 wt. percent boria, alumina-5 to 40 wt. percent chromia, alumina-5 to 40 wt. percent magnesia, alumina-5 to 40 wt. percent boria, thoria-5 to 40 wt. percent magnesia, thoria-5 to 40 wt. percent chromia, thoria-5 to 40 wt percent boria, p-toluene sulfonic acid, sulfonated divinylbenzene crosslinked polystyrene resin, sulfuric acid, polyphosphoric acid, phosphorous oxychloride and phosphorus pentoxide, said temperature being maintained above about 225° C. when said catalyst is the non-phosphorus metal oxide.

2. A method in accordance with claim 1 wherein said contacting is conducted under batch, liquid phase conditions, said catalyst is present in an amount between about 0.7 and 35 wt. percent and said amide is contacted with said cyclohexanone in a mole ratio of between about 1:5 and 5:1.

3. A method in accordance with claim 1 wherein said contacting is conducted under continuous vapor phase conditions at a temperature of at least about 300° C., said catalyst being present in an amount of between about 0.1 and 3 volumes reactant/volume catalyst/hour, and said amide is contacted with said cyclohexanone in a mole ratio of between about 1:5 and 5:1.

4. A method in accordance with claim 3 wherein said catalyst is a silica-magnesia combination.

5. A method in accordance with claim 4 where R is pentyl.

6. A method in accordance with claim 2 wherein said catalyst is polyphosphoric acid and R is undecyl.

7. A method in accordance with claim 2 wherein said catalyst is p-toluene sulfonic acid and said R is undecyl.

8. A method in accordance with claim 2 wherein said catalyst is sulfonated divinylbenzene crosslinked polystyrene resin and said R is undecyl.

9. A method in accordance with claim 2 wherein said reaction is conducted in the presence of a liquid hydrocarbon water forming azeotroping agent having a boiling point between about 60 and 225° C.

References Cited

UNITED STATES PATENTS 3,250,706   5/1966   Kuhn _____ 260—283 X

NICHOLAS S. RIZZO, *Primary Examiner.*

D. G. DAUS, *Assistant Examiner.*